US009917305B2

(12) United States Patent
Kim et al.

(10) Patent No.: US 9,917,305 B2
(45) Date of Patent: Mar. 13, 2018

(54) POSITIVE ELECTRODE ACTIVE MATERIAL, METHOD OF MANUFACTURING THE POSITIVE ELECTRODE ACTIVE MATERIAL, AND LITHIUM BATTERY EMPLOYING THE POSITIVE ELECTRODE ACTIVE MATERIAL

(75) Inventors: Chang-Hyuk Kim, Yongin-si (KR); Do-Hyung Park, Yongin-si (KR); Seon-Young Kwon, Yongin-si (KR); Min-Han Kim, Yongin-si (KR); Ji-Hyun Kim, Yongin-si (KR); Jeong-Seop Lee, Yongin-si (KR); Yoon-Chang Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 1610 days.

(21) Appl. No.: 13/243,127

(22) Filed: Sep. 23, 2011

(65) Prior Publication Data
US 2012/0156565 A1   Jun. 21, 2012

(30) Foreign Application Priority Data
Dec. 20, 2010   (KR) .......................... 10-2010-0130934

(51) Int. Cl.
*H01M 4/131*   (2010.01)
*H01M 4/485*   (2010.01)
(Continued)

(52) U.S. Cl.
CPC ......... *H01M 4/485* (2013.01); *H01M 4/0471* (2013.01); *H01M 4/131* (2013.01); *H01M 4/366* (2013.01); *H01M 4/525* (2013.01)

(58) Field of Classification Search
CPC ............ H01M 10/0525; H01M 4/485; H01M 4/0471; H01M 4/131; H01M 4/525; H01M 4/366; Y02E 60/122
See application file for complete search history.

(56) References Cited

U.S. PATENT DOCUMENTS

| 6,753,111 B2 | 6/2004 | Kweon et al. |
| 6,916,580 B2 * | 7/2005 | Cho et al. .................. 429/231.1 |
| 2008/0131778 A1 | 6/2008 | Watanabe et al. |

FOREIGN PATENT DOCUMENTS

| JP | 2007-005267 A | 1/2007 |
| JP | 2008-041570 A | 2/2008 |

(Continued)

OTHER PUBLICATIONS

Liu et al., "A comparative study of $LiNi_{0.8}Co_{0.2}O_2$ cathode materials modified by lattice-doping and surface-coating," *Solid State Ionics* 166 (2004) 317-325.

(Continued)

*Primary Examiner* — Lisa S Park
(74) *Attorney, Agent, or Firm* — Knobbe Martens Olson & Bear LLP (57) ABSTRACT

In one aspect, a positive electrode active material is provided, a method of manufacturing the positive electrode active material, and a lithium battery employing the positive electrode active material. The positive electrode active material may have high thermal stability and low capacity deterioration despite repetitive charging and discharging.

13 Claims, 5 Drawing Sheets

(51) Int. Cl.
    *H01M 4/04*     (2006.01)
    *H01M 4/36*     (2006.01)
    *H01M 4/525*     (2010.01)

(56) References Cited

FOREIGN PATENT DOCUMENTS

| | | | |
|---|---|---|---|
| JP | 2008-159560 A | | 7/2008 |
| JP | 4316218 B2 | | 5/2009 |
| KR | 10-2006-0085085 A | | 7/2006 |
| KR | 10-0696619 B1 | | 3/2007 |
| KR | 10-2008-0045855 A | | 5/2008 |
| KR | 1020080045855 | * | 5/2008 .............. H01M 4/48 |

OTHER PUBLICATIONS

Korean Office Action dated Jan. 17, 2013 for Korean Patent Application No. KR 10-2010-0130934 which corresponds to captioned U.S. Appl. No. 13/243,127.

Korean Notice of Allowance dated Jul. 30, 2013 for Korean Patent Application No. KR 10-2010-0130934 which corresponds to captioned U.S. Appl. No. 13/243,127.

* cited by examiner

POSITIVE ELECTRODE ACTIVE MATERIAL, METHOD OF MANUFACTURING THE POSITIVE ELECTRODE ACTIVE MATERIAL, AND LITHIUM BATTERY EMPLOYING THE POSITIVE ELECTRODE ACTIVE MATERIAL

CROSS-REFERENCE TO RELATED APPLICATIONS

This application claims the benefit of Korean Patent Application No. 10-2010-0130934, filed on Dec. 20, 2010, in the Korean Intellectual Property Office, the disclosure of which is incorporated herein in its entirety by reference.

BACKGROUND

Field

One or more embodiments relate to a positive electrode active material, a method of manufacturing the positive electrode active material, and a lithium battery employing the positive electrode active material.

Description of the Related Technology

A lithium secondary battery using an organic electrolyte solution or a polymer electrolyte solution is a battery having high energy density due to the lithium secondary battery having a high discharge voltage equal to or higher than twice that of a battery using an alkali aqueous solution.

Some lithium secondary batteries are manufactured by using a material, in which lithium ions are intercalatable and deintercalatable, as a negative electrode and a positive electrode, and charging an organic electrolyte solution or a polymer electrolyte solution between the negative electrode and the positive electrode. Electric energy is generated according to an oxidation reaction and a reduction reaction where the lithium ions are intercalated into the positive electrode and deintercalated from the negative electrode.

Some lithium secondary batteries use lithium cobalt oxide ($LiCoO_2$) as a positive electrode active material of the lithium secondary battery. However, manufacturing costs of the $LiCoO_2$ are high, and it is difficult to reliably obtain $LiCoO_2$. Some lithium secondary batteries have replaced cobalt using nickel and/or manganese in positive electrode active materials.

Positive electrode active materials including a nickel-based complex oxide are being developed for its low price, high capacity, and high voltage. However, these materials compared to the $LiCoO_2$ are structurally unstable due to a large amount of deintercalated lithium ions during charging, have a capacity that is relatively easily deteriorated through charging and discharging, and have relatively weak thermal stability due to a reaction with an electrolyte solution. The present embodiments overcome the above problems as well as provide additional advantages.

SUMMARY

One or more embodiments include a positive electrode active material having thermal stability, and low capacity deterioration despite repetitive charging and discharging.

One or more embodiments include a method of manufacturing the positive electrode active material.

One or more embodiments include a lithium battery employing the positive electrode active material.

Additional aspects will be set forth in part in the description which follows and, in part, will be apparent from the description, or may be learned by practice of the presented embodiments.

According to one or more embodiments, a positive electrode active material includes: a core including a lithium nickel-based complex oxide; and a complex coating layer formed on a surface of the core and including titanium dioxide ($TiO_2$) and lithium titanium oxide ($LiTi_xO_y$), wherein $1 \le x \le 2$ and $2.5 \le y \le 3$, and an amount of lithium is higher on the surface of the core than a total average composition of the core.

According to one or more embodiments, a method of manufacturing a positive electrode active material, comprising: mixing a lithium nickel-based complex oxide, in which more lithium exists on a surface than in a total average composition, with a titanium dioxide ($TiO_2$)-containing solution to prepare a mixture; and heat-treating the mixture at a temperature from about 300° C. to about 800° C. after drying the mixture, wherein a complex coating layer including $TiO_2$ and lithium titanium oxide ($LiTi_xO_y$) is formed on the surface of the lithium nickel-based complex oxide, wherein $1 \le x \le 2$ and $2.5 \le y \le 3$.

According to one or more embodiments, a method of manufacturing a positive electrode active material, comprising: preparing a coating solution including titanium dioxide ($TiO_2$) and lithium titanium oxide ($LiTi_xO_y$), wherein $1 \le x \le 2$ and $2.5 \le y \le 3$; and adding a lithium nickel-based complex oxide, in which more lithium exists on a surface than in a total average composition, to the coating solution, wherein a complex coating layer including $TiO_2$ and $LiTi_xO_y$ is formed on the surface of the lithium nickel-based complex oxide, wherein $1 \le x \le 2$ and $2.5 \le y \le 3$.

According to one or more embodiments, an electrode for a lithium battery, the electrode including the positive electrode active material, and a lithium battery including a positive electrode that includes the positive electrode active material.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

A positive electrode active material according to an embodiment as disclosed and described herein includes a core including a lithium nickel-based complex oxide, and a complex coating layer formed on a surface of the core and including titanium dioxide ($TiO_2$) and lithium titanium oxide ($LiTi_xO_y$), wherein $1 \leq x \leq 2$ and $2.5 \leq y \leq 3$.

In some embodiments, the positive electrode active material can have a high amount of the lithium nickel-based complex oxide while securing structural stability by forming the complex coating layer including $TiO_2$ and $LiTi_xO_y$ on the surface of the core. Thus, the positive electrode active material may have excellent thermal stability and charging and discharging capacity.

In some embodiments, the core may be formed of at least one compound selected from the group consisting of compounds represented by Formulas 1 through 5 below.

$$Li_aNi_{1-b}Co_bO_{2-c}X_c \quad \text{[Formula 1]}$$

$$Li_aNi_{1-b-c}Co_bM_cA_p \quad \text{[Formula 2]}$$

$$Li_aNi_{1-b-c}Co_bM_cO_{2-p}X_p \quad \text{[Formula 3]}$$

$$Li_aNi_{1-b-c}Mn_bM_cA_p \quad \text{[Formula 4]}$$

$$Li_aNi_{1-b-c}Mn_bM_cO_{2-p}X_p \quad \text{[Formula 5]}$$

wherein, $0.95 \leq a \leq 1.35$, $0 \leq b \leq 0.5$, $0 \leq c \leq 0.5$, $0 \leq p \leq 2$, M can be at least one element selected from the group consisting of aluminum (Al), nickel (Ni), cobalt (Co), manganese (Mn), chromium (Cr), iron (Fe), magnesium (Mg), strontium (Sr), vanadium (V), scandium (Sc), yttrium (Y), and a lanthanide element, A can be at least one element selected from the group consisting of oxygen (O), fluorine (F), sulfur (S), and phosphorous (P), and X can be at least one element selected from the group consisting of F, S, and P.

In some embodiments, the amount of lithium may be higher in the surface of the core contacting the complex coating layer than in a total average composition so that the $LiTi_xO_y$ is easily formed as the core reacts with the $TiO_2$ forming the complex coating layer.

For example, $0.95 \leq a \leq 1.35$ in the compounds of Formulas 1 through 5, so that the amount of the lithium in a surface composition of the core is higher than the amount of lithium contained in the total average composition. According to an embodiment, in the total average composition of the core, $0.95 \leq a \leq 1.1$, specifically $0.95 \leq a \leq 1.05$ in Formulas 1 through 5, and in the surface composition of the core, $1.05 \leq a \leq 1.35$, specifically, $1.08 \leq a \leq 1.35$ so that the amount of lithium can be higher compared to that in the total average composition.

According to an embodiment, the complex coating layer formed on the surface of the core may have a structure in which $LiTi_xO_y$ crystals are dispersed in a $TiO_2$ matrix. In some embodiments, the $LiTi_xO_y$ crystals in the $TiO_2$ matrix may be adjacent to the surface of the core. Since the positive electrode active material uses an lithium nickel-based complex oxide having abundant lithium on at least the surface of the core, the lithium can be externally diffused from the core including the lithium nickel-based complex oxide, and some of the lithium may exist on the surface of the core as impurities in a form of lithium hydroxide (LiOH) or lithium carbonate ($Li_2Co_3$). In some embodiments, the externally diffused lithium or the impuritieson the surface of the core may combine with $TiO_2$ while forming the complex coating layer, thereby forming $LiTi_xO_y$. Accordingly, the $LiTi_xO_y$ crystals, crystallized via heat treatment, may be dispersed in the $TiO_2$ matrix, while being disposed adjacent to the surface of the core including the lithium nickel-based complex oxide.

In some embodiments, a composition ratio of $LiTi_xO_y$ to $TiO_2$ may change in the complex coating layer, according to amounts of lithium reacting with each other and lithium constituting impurities, and the amount of $TiO_2$.

A total amount of $TiO_2$ and $LiTi_xO_y$ may be from about 0.01 to about 50 wt %, specifically, from about 0.01 to about 20 wt %, and more specifically, from about 0.01 to about 10 wt %, based on a total weight of the positive electrode active material. In some embodiments, the total amount of $TiO_2$ and $LiTi_xO_y$ can be within the above range, the complex coating layer having structural stability may be formed on the surface of the core, and the positive electrode active material having excellent thermal stability and capacity characteristics may be obtained.

A method of manufacturing the positive electrode active material, according to an embodiment will now be described. In some embodiments, the positive electrode active material can include a core formed of at least one compound selected from the group consisting of compounds represented by Formulas 1 through 5 below:

$$Li_aNi_{1-b}Co_bO_{2-c}X_c \quad \text{[Formula 1]}$$

$$Li_aNi_{1-b-c}Co_bM_cA_p \quad \text{[Formula 2]}$$

$$Li_aNi_{1-b-c}Co_bM_cO_{2-p}X_p \quad \text{[Formula 3]}$$

$$Li_aNi_{1-b-c}Mn_bM_cA_p \quad \text{[Formula 4]}$$

$$Li_aNi_{1-b-c}Mn_bM_cO_{2-p}X_p, \quad \text{[Formula 5]}$$

wherein a, b, c, and p each respectively satisfy $0.95 \leq a \leq 1.35$, $0 \leq b \leq 0.5$, $0 \leq c \leq 0.5$, $0 \leq p \leq 2$, M is at least one element selected from the group consisting of aluminum (Al), nickel (Ni), cobalt (Co), manganese (Mn), chromium (Cr), iron (Fe), magnesium (Mg), strontium (Sr), vanadium (V), scandium (Sc), yttrium (Y), and a lanthanide element, A is at least one element selected from the group consisting of oxygen (O), fluorine (F), sulfur (S), and phosphorous (P), and X is at least one element selected from the group consisting of F, S, and P. In some embodiments, the positive electrode active material can include $0.95 \leq a \leq 1.1$ in Formulas 1 through 5 in the total average composition of the core, and $1.05 \leq a \leq 1.35$ in Formulas 1 through 5 in a surface composition of the core.

In some embodiments, the positive electrode active material may be obtained via a sol-gel method by using a raw material of the positive electrode active material. For example, the positive electrode active material, in which the complex coating layer including $TiO_2$ and $LiTi_xO_y$ can be formed on the surface of the nickel-based complex oxide, wherein $1 \leq x \leq 2$ and $2.5 \leq y \leq 3$, may be manufactured by mixing the lithium nickel-based complex oxide, in which more lithium exists on the surface than in the total average composition, with the $TiO_2$-containing solution to obtain a mixture, and heat-treating the mixture at a temperature from about 300° C. to about 800° C. after drying the mixture.

Figure 1:
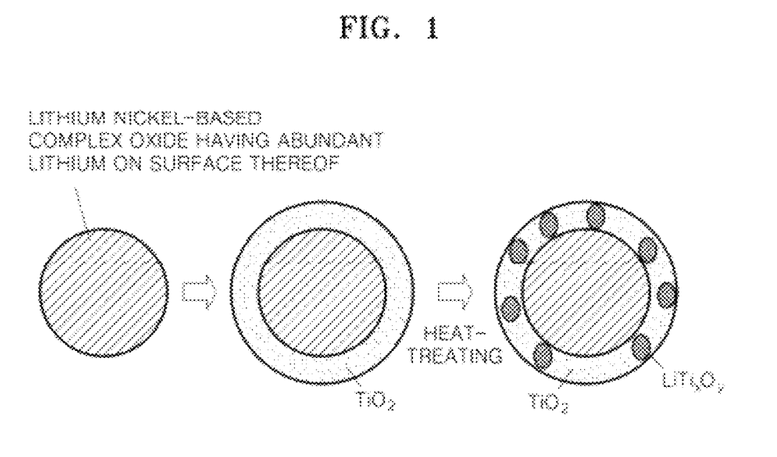
FIG. 1 is a schematic diagram for describing a method of manufacturing a positive electrode active material, according to an embodiment.

FIG. 1 is a schematic diagram for describing the method of manufacturing the positive electrode active material, according to one embodiment. Referring to FIG. 1, a $TiO_2$ coating layer is first coated on a surface of the lithium-nickel-based complex oxide having abundant lithium on the surface, and then the complex coating layer having the structure in which the $LiTi_xO_y$ crystals are dispersed in the $TiO_2$ matrix is formed as lithium diffused from the lithium-nickel-based complex oxide of the core reacts with $TiO_2$ via heat treatment.

The method will now be described in detail. First, the lithium nickel-based complex oxide, wherein more lithium exists on the surface than in the total average composition, constituting the raw material of the positive electrode active material is mixed with the $TiO_2$-containing solution to obtain the mixture.

The lithium nickel-based complex oxide may be formed of at least one compound selected from the group consisting of the compounds of Formulas 1 through 5 below.

$$Li_aNi_{1-b}Co_bO_{2-c}X_c \quad \text{[Formula 1]}$$

$$Li_aNi_{41-b-c}Co_bM_cA_p \quad \text{[Formula 2]}$$

$$Li_aNi_{1-b-c}Co_bM_cO_{2-p}X_p \quad \text{[Formula 3]}$$

$$Li_aNi_{1-b-c}Mn_bM_cA_p \quad \text{[Formula 4]}$$

$$Li_aNi_{1-b-c}Mn_bM_cO_{2-p}X_p \quad \text{[Formula 5]}$$

wherein, $0.95 \leq a \leq 1.35$, $0 \leq b \leq 0.5$, $0 \leq c \leq 0.5$, $0 \leq p \leq 2$, M can be at least one element selected from the group consisting of Al, Ni, Co, Mn, Cr, Fe, Mg, Sr, V, Sc, Y, and a lanthanide element, A can be at least one element selected from the group consisting of O, F, S, and P, and X can be at least one element selected from the group consisting of F, S, and P.

In some embodiments, the amount of lithium can be higher in the surface of the lithium nickel-based complex oxide than in the total average composition, so that $LiTi_xO_y$ can be easily formed as the lithium nickel-based complex oxide reacts with $TiO_2$.

For example, $0.95 \leq a \leq 1.35$ in the compounds of Formulas 1 through 5, so that the amount of the lithium in a surface composition of the core is higher than the amount of lithium contained in the total average composition. According to an embodiment, in the total average composition of the core, $0.95 \leq a \leq 1.1$, specifically $0.95 \leq a \leq 1.05$ in Formulas 1 through 5, and in the surface composition of the core, $1.05 \leq a \leq 1.35$, specifically, $1.08 \leq a \leq 1.35$ so that the amount of lithium can be higher compared to that in the total average composition.

According to an embodiment, the $TiO_2$-containing solution may be obtained by hydrolyzing an alkoxide, a nitrate, a sulfate, a carbonate, a chloride, or an acetate including a Ti metal, or a mixture thereof by mixing the alkoxide, the nitrate, the sulfate, the carbonate, the chloride, the acetate, or the mixture thereof with water. In some embodiments, a chelating agent, such as acetyl acetone, may also be dissolved so as to prevent $TiO_2$ from rapidly growing.

In some embodiments, amount of $TiO_2$ in the $TiO_2$-containing solution may be from about 0.01 to 10 parts by weight based on 100 parts by weight of the lithium nickel-based complex oxide. In some embodiments, an amount of $TiO_2$ within the above range affords excellent thermal stability and capacity characteristics in the finally obtained positive electrode active material.

A solvent used in the mixture is not specifically limited, and any solvent generally used in the related art may be used. For example, the solvent may be a protic solvent. In some embodiments, the solvent may be isopropanol, butanol, water, ethanol, or methanol. In a typical embodiment, the solvent may be water, ethanol, or methanol.

In some embodiments, the amount of formed $LiTi_xO_y$ may be adjusted by additionally adding a lithium salt, such as a lithium sulfate or a lithium acetate, to the mixture.

In some embodiments, the mixture of the $TiO_2$-containing solution and the lithium nickel-based complex oxide can be stirred at room temperature. In some embodiments, the mixture of the $TiO_2$-containing solution and the lithium nickel-based complex oxide can be stirred at from about 10° C. to about 30° C. In some embodiments, the mixture can be stirred at room temperature so that a forming reaction of the complex coating layer easily occurs. In some embodiments, the mixture can be stirred at from about 10° C. to about 30° C.

In some embodiments, the mixture can be stirred for about 1 to about 6 hours, so that $TiO_2$ can be coated on the surface of the lithium nickel-based complex oxide. Subsequently, the mixture can be filtered and dried, thereby affording a lithium nickel-based complex oxide having the surface coated with $TiO_2$. In some embodiments, the lithium nickel-based complex oxide having the surface coated with $TiO_2$ can be in a powder form.

Subsequently, the lithium nickel-based complex oxide having the powder form can be heat-treated.

In some embodiments, the heat treatment may be performed at a temperature from about 300° C. to about 800° C., in detail, from about 500° C. to about 750° C. In some embodiments, treating the mixture within a temperature within the above range, converts the complex coating layer coated on the surface of the lithium nickel-based complex oxide to a $TiO_2$— $LiTi_xO_y$ complex.

According to an embodiment, $TiO_2$ and $LiTi_xO_y$ may be separately pre-prepared and mixed with the lithium nickel-based complex oxide, thereby simplifying the process and reducing time and costs.

In some embodiments, the positive electrode active material can have capacity equal to or above 160 mAh/g, for example, from about 160 to about 185 mAh/g, and excellent thermal stability.

A lithium battery according to an embodiment will now be described. In some embodiments, the core can be formed of at least one compound selected from the group consisting of compounds represented by Formulas 1 through 5 below:

$$Li_aNi_{1-b}Co_bO_{2-c}X_c \quad \text{[Formula 1]}$$

$$Li_aNi_{1-b-c}Co_bM_cA_p \quad \text{[Formula 2]}$$

$$Li_aNi_{1-b-c}Co_bM_cO_{2-p}X_p \quad \text{[Formula 3]}$$

$$Li_aNi_{1-b-c}Mn_bM_cA_p \quad \text{[Formula 4]}$$

$$Li_aNi_{1-b-c}Mn_bM_cO_{2-p}X_p, \quad \text{[Formula 5]}$$

wherein a, b, c, and p each respectively satisfy $0.95 \leq a \leq 1.35$, $0 \leq b \leq 0.5$, $0 \leq c \leq 0.5$, $0 \leq p \leq 2$, M is at least one element selected from the group consisting of aluminum (Al), nickel (Ni), cobalt (Co), manganese (Mn), chromium (Cr), iron (Fe), magnesium (Mg), strontium (Sr), vanadium (V), scandium (Sc), yttrium (Y), and a lanthanide element, A is at least one element selected from the group consisting of oxygen (O), fluorine (F), sulfur (S), and phosphorous (P), and X is at least one element selected from the group consisting of F, S, and P. In some embodiments, the lithium battery can include $0.95 \leq a \leq 1.1$ in Formulas 1 through 5 in the total average composition of the core, and $1.05 \leq a \leq 1.35$ in Formulas 1 through 5 in a surface composition of the core. In some embodiments, a total amount of $TiO_2$ and $LiTi_xO_y$ can be from about 0.01 to about 50 wt % based on a total weight of the positive electrode active material.

In some embodiments, the lithium battery employs a positive electrode including the positive electrode active material described above, and may be manufactured as follows.

First, the positive electrode may be formed by molding a positive electrode mixture material including the positive electrode active material, a binder, etc., to a predetermined shape, or by coating the positive electrode mixture material on a current collector, such as a copper foil or an aluminum foil.

The positive electrode mixture material may be prepared by mixing the positive electrode active material, a conductive material, a bonding agent, and a solvent. A positive electrode plate may be obtained by directly coating the positive electrode mixture material on an aluminum foil current collector, or by casting the positive electrode mixture material on a separate support and laminating a film of the positive electrode active material, which can be detached from the separate support, on an aluminum foil current collector. However, the method of manufacturing the positive electrode is not limited thereto, and may vary.

In some embodiments, the conductive material may be carbon black or graphite particles, the bonding agent may be vinylidene fluoride/hexafluoropropylene copolymer, polyvinylidene fluoride (PVDF), polyacrylonitrile, polymethylmethacrylate, polytetrafluoroethylene, a mixture thereof, or styrene butadiene rubber-based polymer, and the solvent may be N-methylpyrrolidone, acetone, or water. Amounts of the positive electrode active material, the conductive material, the bonding agent, and the solvent can be similar to levels used in a lithium battery.

Next, a negative electrode mixture material can be prepared by mixing a negative electrode active material, a bonding agent, a solvent, and selectively a conductive material. A negative electrode plate may be obtained by directly coating the negative electrode mixture material on a copper current collector, or by casting the negative electrode mixture material on a separate support and laminating a film of the negative electrode active material, which is detached from the separate support, on a copper current collector. In some embodiments, amounts of the negative electrode active material, the conductive material, the bonding agent, and the solvent can be similar as used in a lithium battery.

In some embodiments, the negative electrode active material may be a lithium metal, a lithium alloy, a carbon material, or graphite. In some embodiments, the conductive material, the bonding agent, and the solvent of the negative electrode mixture material may be identical to those of the positive electrode mixture material. In some embodiments, a plasticizer may be further added to the positive electrode mixture material and the negative electrode mixture material so as to form pores inside the positive electrode plate and the negative electrode plate.

In some embodiments, the positive electrode and the negative electrode may be separated by a separator, and any separator used in a lithium battery may be used. Specifically, the separator may have low resistance to ion movement of an electrolyte, and an excellent electrolyte solution holding capability. For example, the separator may be formed of a material selected from the group consisting of a glass fiber, polyester, Teflon, polyethylene, polypropylene, polytetrafluoroethylene (PTFE), or a compound thereof, and may have a non-woven fabric shape or a woven fabric shape. In a typical embodiment, a windable separator formed of polyethylene, polypropylene, or the like, may be used in a lithium ion battery, and a separator having an excellent organic electrolyte solution impregnation capability may be used in a lithium ion polymer battery. In some embodiments, the separator may be manufactured as follows.

A separator composition can be prepared by mixing a polymer resin, a filler, and a solvent, and then a separator film may be formed by directly coating and drying the separator composition on an electrode. In an alternative embodiment, the separator composition may be cast and dried on a support, and a separator film detached from the support may be laminated on an electrode.

The polymer resin is not specifically limited, and any material used in a binder of an electrode plate may be used. For example, the polymer resin may be a vinylidene fluoride/hexafluoropropylene copolymer, polyvinylidene fluoride (PVDF), polyacrylonitrile, polymethylmethacrylate, or a mixture thereof.

In some embodiments, the electrolyte solution may be obtained by dissolving a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, or a mixture thereof, in a solvent, such as propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylaceteamide, dimethylsulfoxide, dioxane, 1,2-dimethoxyethane, sulforane, dichloroethane, chlorobenzene, nitrobenzene, diethylene glycol, dimethyl ether, or a mixture thereof.

In some embodiments, a battery structure can be formed by disposing the separator between the positive electrode plate and the negative electrode plate. Such a battery structure is wound or folded and accommodated in a cylindrical battery case or a polygonal battery case. Subsequently, the organic electrolyte solution can be injected into the cylindrical or polygonal battery case, affording a lithium ion battery.

The present embodiments will be described in greater detail with reference to the following examples. The following examples are for illustrative purposes only and are not intended to limit the scope of the one or more embodiments.

Example 1: Manufacture of Positive Electrode Active Material

First, 5 g of titanium butoxide and 1 g of acetylacetone were dissolved in 300 mL of ethanol, and then 0.5 g of deionized water was mixed therein, thereby preparing a $TiO_2$ mixture. Subsequently, 100 g of lithium nickel-based complex oxide, having a total average composition of $Li_{1.00}Ni_{0.5}Co_{0.2}Mn_{0.3}O_2$ and a surface composition of $Li_{1.09}Ni_{0.53}Co_{0.19}Mn_{0.28}O_2$, was mixed with the $TiO_2$ mixture to prepare a further mixture. The further mixture was stirred at room temperature for 4 hours to afford a mixture including precipitates. The further mixture including precipitates was filtered and dried so as to obtain the precipitates in a powder form, having $TiO_2$ coated on a surface of the lithium nickel-based complex oxide. The powder was heat-treated for 7 hours at 600° C. so as to prepare a positive electrode active material, having $TiO_2$—$LiTi_xO_y$ ($1 \leq x \leq 2$ and $2.5 \leq y \leq 3$) coated on the surface of the lithium nickel-based complex oxide.

Comparative Example 1

A positive electrode active material, in which $TiO_2$ was coated on a surface of a lithium nickel-based complex oxide, was prepared in the same manner as in Example 1, except that the heat-treatment was not performed.

Figure 2:
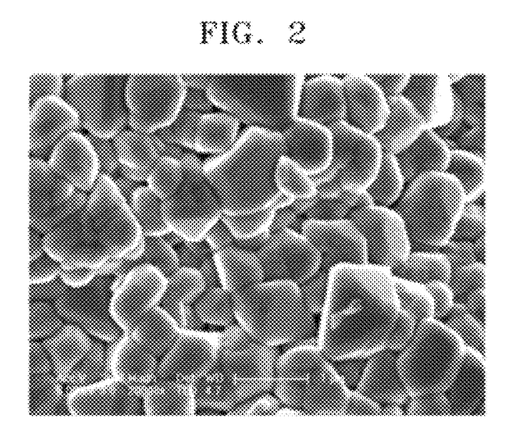
FIG. 2 is a scanning electron microscope (SEM) photographic image of a positive electrode active material according to Example 1, before being coated with titanium dioxide ($TiO_2$)
Figure 3:
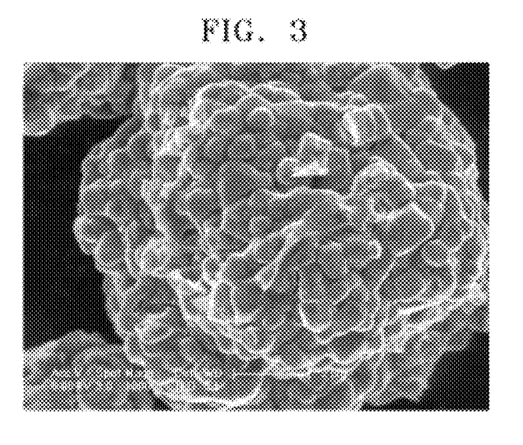
FIG. 3 is an SEM photographic image of the positive electrode active material according to Example 1, after being coated with $TiO_2$.
Figure 4:
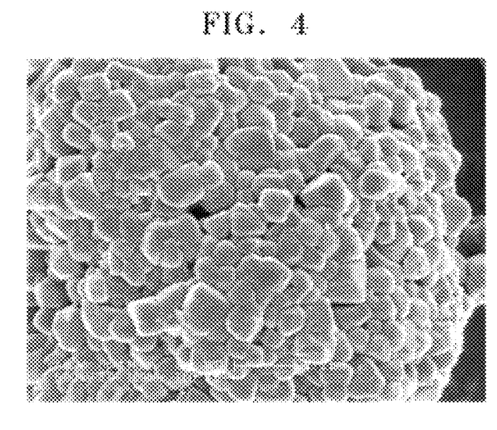
FIGS. 4 and 5 are SEM photographic images of the positive electrode active material according to Example 1, after a titanium dioxide-lithium titanium oxide ($TiO_2$—$LiTi_xO_y$) complex coating layer is formed.
Figure 5:
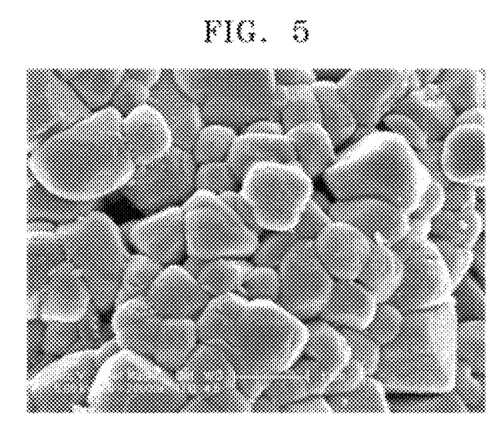

The positive electrode active material prepared according to Example 1 was magnified up to 40,000 times and analyzed by using a scanning electron microscope (SEM). FIG. 2 is a SEM photographic image of the positive electrode active material of Example 1, before coating $TiO_2$, FIG. 3 is an SEM photographic image of the positive electrode active material of Example 1, after coating $TiO_2$, and FIGS. 4 and 5 are SEM photographic images of the positive electrode active material of Example 1, after coating with a titanium dioxide-lithium titanium oxide ($TiO_2$—$LiTi_xO_y$) complex to afford a coating layer.

Example 2: Manufacture of Positive Electrode and Lithium Battery Using the Positive Electrode The powder of the positive electrode active material prepared in Example 1 and a carbon conductive material (Ketjen Black; EC-600JD) were uniformly mixed at a weight ratio of 93:4, and then a PVDF binder solution was added thereto so as to prepare a slurry, wherein a weight ratio of the positive electrode active material:carbon conductive material:PVDF binder solution was 93:4:4.

The slurry was coated and dried on an aluminum foil having a thickness of 15 μm to prepare a positive electrode plate, and then the positive electrode plate was additionally vacuum-dried so as to manufacture a coin cell (CR2032 type) having a diameter of 12 mm.

A metal lithium was used as a counter electrode while manufacturing the coin cell, and an electrolyte was obtained by dissolving 1.3M $LiPF_6$ in a mixture of ethylenecarbonate (EC):diethylcarbonate (DEC) (volume ratio of 3:7). A plurality of lithium batteries were manufactured.

Comparative Example 2

A lithium battery was manufactured in the same manner as Example 2, except that the positive electrode active material of Comparative Example 1 was used.

Coin Cell Charging and Discharging Test

Evaluation Example 1

The coin cells manufactured in Example 2 and Comparative Example 2 were charged in a constant current of 125 mA/g until a voltage reached 4.3 V (Vs. Li). After the voltage reached 4.3 V, the coin cells of Example 2 and Comparative Example 2 were charged at a constant voltage of 4.3 V until a value of the constant current decreased by ⅒. After the charging, the coin cells were each discharged with a constant current of 50 mA/g until a voltage reached 3 V (vs. Li), and then discharge capacities of the coin cells were measured. Such charging and discharging were performed 3 times.

In a fourth cycle, the coin cells were charged at a constant current of 125 mA/g and a constant voltage of 4.3 V, until a voltage reached 4.3 V (vs. Li). After charging, the coin cells were discharged at a constant current of 25 mA/g (0.1 C rate) until the voltage reached 3 V (vs. Li).

In a fifth cycle, the coin cells were charged at a constant current of 125 mA/g and a constant voltage of 4.3 V, until a voltage reached 4.3 V (vs. Li). After charging, the coin cells were discharged at a constant current of 250 mA/g (1 C rate) until the voltage reached 3 V (vs. Li).

In sixth through fiftieth cycles, the coin cells were charged at a constant current of 125 mA/g and a constant voltage of 4.3 V, until a voltage reached 4.3 V (vs. Li). After charging, the coin cells were discharged at a constant current of 125 mA/g (0.5 C rate) until the voltage reached 3 V (vs. Li).

The charging and discharging test was performed at a temperature of 25° C.

Measurement results are shown in Table 1 below. An initial coulombic efficiency is represented by Equation 1 below. High rate discharge characteristics are represented by a rate capability (1 C/0.1 C) of Equation 2 below. A retention ratio is represented by Equation 3 below.

Initial Coulombic Efficiency [%]=[Discharge Capacity in 1st Cycle/Charge Capacity in 1st Cycle]×100     <Equation 1>

Discharge Capacity Rate [%]=[Discharge Capacity in 1 C Rate (5th Cycle)/Discharge Rate in 0.1 C Rate (4th Cycle)]×100     <Equation 2>

Capacity Retention Ratio [%]=[Discharge Capacity in 50th Cycle/Discharge Capacity in 1st Cycle]×100     <Equation 3>

TABLE 1

|  | Initial Coulombic Efficiency [%] | Discharge Capability Rate [%] | Capacity Retention Ratio [%] |
| --- | --- | --- | --- |
| Example 2 | 89 | 87 | 89 |
| Comparative Example 2 | 86 | 85 | 85 |

As shown in Table 1 above, the lithium battery of Example 2 had a higher initial coulombic efficiency, higher high rate characteristics (rate capability), and a higher cycle life (retention ratio) than the lithium battery of Comparative Example 2.

Thermal Stability Test of Positive Electrode Active Material

Evaluation Example 2

The coin cells of Example 2 and Comparative Example 2 were charged at a constant current of 0.1 C CC/CV until a voltage reached 4.3 V (vs. Li). After the voltage reached 4.3 V, the coin cells were charged at a constant voltage of 4.3 V until a value of the constant current decreased by ⅒. After the charging, the coin cells were disassembled in a dry room in such a way that interference between positive electrodes was not generated, and then a compound on a positive electrode plate was obtained to evaluate thermal stability. Differential scanning calorimetry (DSC) analysis was used to evaluate thermal stability, wherein a temperature was increased from 50° C. to 350° C. by 5° C. per minute, and a caloric value of a positive electrode material in the compound generated by reacting with an electrolyte solution according to temperature was converted with respect to unit mass.

The charging and discharging were performed at room temperature of 25° C.

The charged coin cells were broken to extract the positive electrode active materials, and DSC analysis was performed on the positive electrode active materials. The results of analyzing the positive electrode active materials of the lithium batteries of Example 2 and Comparative Example 2 are respectively shown in FIGS. 6 and 7.

Figure 6:
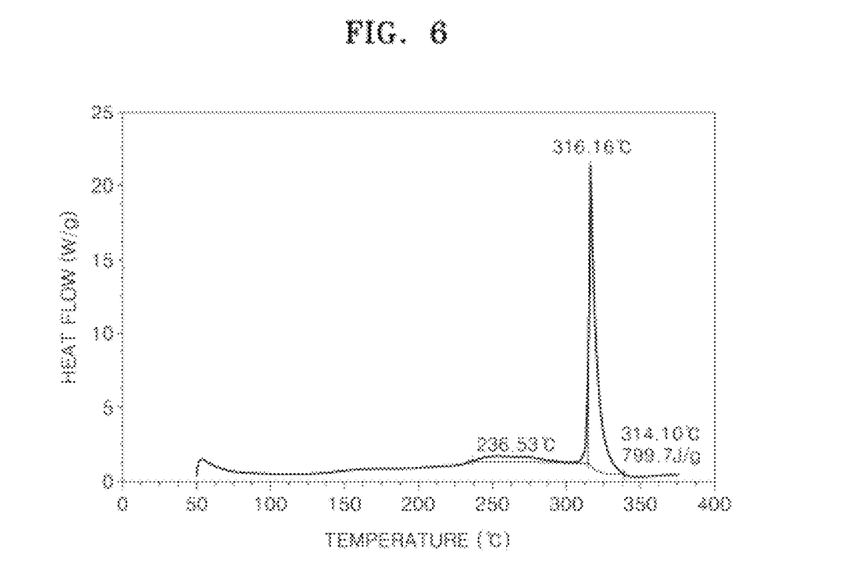
FIG. 6 is a graph showing thermal stability of a lithium battery manufactured according to Example 3, by using a differential scanning calorimetry (DSC)
Figure 7:
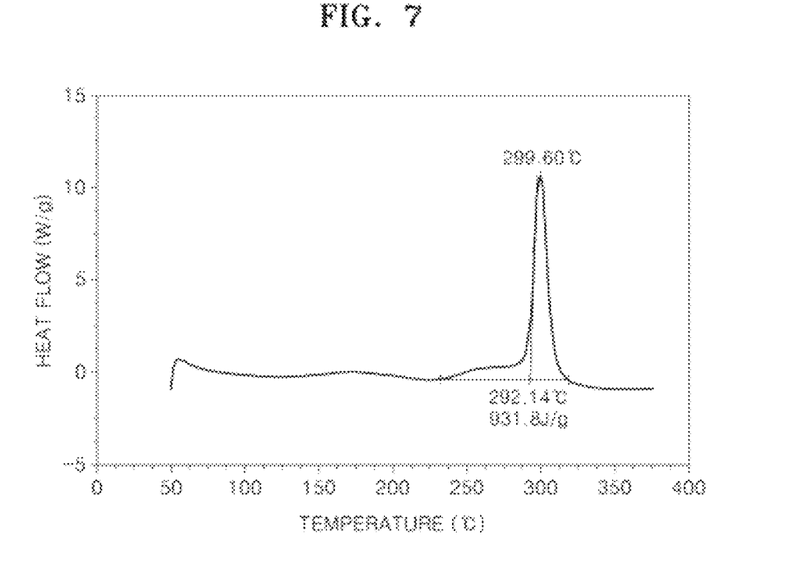
FIG. 7 is a graph showing thermal stability of a lithium battery manufactured according to Comparative Example 3, by using a DSC.

As shown in FIGS. 6 and 7, the positive electrode active material of Example 1 used in the lithium battery of Example 2 had higher thermal stability than the positive electrode active material of Comparative Example 1 used in the lithium battery of Comparative Example 2. Referring to FIG. 7, when $TiO_2$ is coated on the surface of the lithium nickel-based complex oxide, and is not heat-treated as in Comparative Example 1, thermal stability follows characteristics of the positive electrode active material regardless of a coated material. However, as shown in FIG. 6, when the complex coating layer including $TiO_2$ and $LiTi_xO_y$ is formed by coating and heat-treating $TiO_2$, properties that affect thermal stability change.

As described above, according to the positive electrode active material of the embodiment of the present invention, by forming a complex coating layer including $TiO_2$ and $LiTi_xO_y$ having excellent structural stability on a surface of a core including a lithium nickel-based complex oxide, high capacity characteristics of a base of the positive electrode active material are protected while increasing thermal stability and decreasing capacity deterioration that occurs due to repetitive charging and discharging.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from the spirit and scope of the present embodiments as defined by the following claims.

What is claimed is:

1. A positive electrode active material comprising:
a core having a total average composition and a surface, wherein the a total average composition of the core is represented by Formula 2 and the composition of the surface is represented by Formula 2'; and
a complex coating layer formed on the surface and comprising titanium dioxide ($TiO_2$) and lithium titanium oxide ($LiTi_xO_y$),
wherein $1 \leq x \leq 2$ and $2.5 \leq y \leq 3$, $$Li_aNi_{1-b-c}Co_bM_cA_p \quad \text{[Formula 2]}$$

wherein a, b, c, and p each respectively satisfy $0.95 \leq a \leq 1.05$, $0 < b \leq 0.5$, $0 < c \leq 0.5$, $p=2$, M is manganese (Mn), and A is oxygen (O), and $$Li_{a'}Ni_{1-b'-c'}Co_{b'}Mn_{c'}O_2 \quad \text{[Formula 2']}$$

wherein a', b', and c' each respectively satisfy $1.08 \leq a' \leq 1.35$, $0 < b' \leq 0.5$, $0 < c' \leq 0.5$, and $a' > a$.

2. The positive electrode active material of claim 1, wherein is manganese the total average composition of the core is represented by $Li_{1.00}Ni_{0.5}Co_{0.2}Mn_{0.3}O_2$.

3. The positive electrode active material of claim 2, wherein the composition of the surface is represented by $Li_{1.09}Ni_{0.53}Co_{0.19}Mn_{0.28}O_2$.

4. The positive electrode active material of claim 1, wherein the complex coating layer has a structure in which $LiTi_xO_y$ crystals are distributed in a $TiO_2$ matrix.

5. The positive electrode active material of claim 4, wherein, in the complex coating layer, the $LiTi_xO_y$ crystals in the $TiO_2$ matrix are adjacent to the surface of the core.

6. The positive electrode active material of claim 1, wherein a total amount of $TiO_2$ and $LiTi_xO_y$ is from about 0.01 to about 50 wt % based on a total weight of the positive electrode active material.

7. The positive electrode active material of claim 1, wherein a total amount of $TiO_2$ and $LiTi_xO_y$ is from about 0.01 to about 20 wt % based on a total weight of the positive electrode active material.

8. The positive electrode active material of claim 1, wherein a total amount of $TiO_2$ and $LiTi_xO_y$ is from about 0.01 to about 10 wt % based on a total weight of the positive electrode active material.

9. An electrode for a lithium battery, the electrode comprising the positive electrode active material of claim 1.

10. The electrode for a lithium battery of claim 9, wherein the composition of the surface is represented by $Li_{1.09}Ni_{0.53}Co_{0.19}Mn_{0.28}O_2$.

11. A lithium battery comprising a positive electrode that comprises the positive electrode active material of claim 1.

12. The electrode for a lithium battery of claim 11, wherein the composition of the surface is represented by $Li_{1.09}Ni_{0.53}Co_{0.19}Mn_{0.28}O_2$.

13. The positive electrode active material of claim 11, wherein a total amount of $TiO_2$ and $LiTi_xO_y$ is from about 0.01 to about 50 wt % based on a total weight of the positive electrode active material.

* * * * *